United States Patent
Jung et al.

(10) Patent No.: US 7,146,032 B2
(45) Date of Patent: Dec. 5, 2006

(54) DEVICE AND METHOD FOR READING OUT AN ELECTRONIC IMAGE SENSOR THAT IS SUBDIVIDED INTO IMAGE POINTS

(75) Inventors: Norbert Jung, Wuerselen (DE); Kai Eck, Aachen (DE)

(73) Assignee: Koninklijke Philips Electronic, N.V., Eindhoven (NL)

( * ) Notice: Subject to any disclaimer, the term of this patent is extended or adjusted under 35 U.S.C. 154(b) by 618 days.

(21) Appl. No.: 10/040,063

(22) Filed: Oct. 29, 2001

(65) Prior Publication Data

US 2002/0105584 A1  Aug. 8, 2002

(30) Foreign Application Priority Data

Oct. 31, 2000  (DE)  ................................. 10 53 934

(51) Int. Cl.
*G06K 9/00* (2006.01)

(52) U.S. Cl. ...................................... 382/132; 348/294

(58) Field of Classification Search ........ 382/128–134; 348/294, 303, 304
See application file for complete search history.

(56) References Cited

U.S. PATENT DOCUMENTS

| | | | | |
|---|---|---|---|---|
| 4,736,401 A | * | 4/1988 | Donges et al. | .............. 378/146 |
| 5,530,935 A | * | 6/1996 | Dillen | ........................ 378/98.2 |
| 5,647,663 A | * | 7/1997 | Holmes | ....................... 600/407 |
| 6,123,670 A | * | 9/2000 | Mo | ............................. 600/447 |
| 6,404,938 B1 | * | 6/2002 | Chien et al. | ................ 382/312 |
| 6,437,338 B1 | * | 8/2002 | Hoffman | ................ 250/370.09 |
| 6,713,773 B1 | * | 3/2004 | Lyons et al. | ............. 250/492.3 |

FOREIGN PATENT DOCUMENTS

DE  19531627 C  10/1996

* cited by examiner

*Primary Examiner*—Jingge Wu
*Assistant Examiner*—Shefali Patel

(57) ABSTRACT

A method for reading out image points of a two-dimensional electronic image sensor includes subdivided the image into at least two different regions where the region of greater interest ROI is read at a scanning rate which is higher than that used for other regions. Consequently, the region of interest can be reproduced with a higher temporal resolution. The sensitivity of the reading unit is adapted in conformity with the scanning rate of a relevant image point so as to take into account the fact that image points that are read out less frequently collect a light intensity over a prolonged period of time and hence may reach high signal strengths. Regions that are less frequently read out can also be irradiated with a lower radiation intensity by applying appropriate masking. The method is very suitable for the imaging of time-critical processes in medical X-ray applications.

18 Claims, 1 Drawing Sheet

DEVICE AND METHOD FOR READING OUT AN ELECTRONIC IMAGE SENSOR THAT IS SUBDIVIDED INTO IMAGE POINTS

The invention relates to a method for reading out an electronic image sensor that is subdivided into image points and wherefrom image points or groups of image points can be read out with a predetermined clock period. The invention also relates to a device for reading out an electronic image sensor that is subdivided into image points and is provided with an addressing unit for selecting the image points and/or groups of image points to be read out within one clock period and with a reading unit for reading out the selected and addressed image points and/or groups of image points.

Electronic image sensors, for example as used for the reproduction of X-ray images, generally consist of a two-dimensional field (array) of image points. These image points are read out by reading units at a predetermined, as high as possible rate of typically from 30 to 60 images per second, after which they are further processed by a computer and inter alia displayed on a monitor. Generally speaking, the image points are arranged in rows (or columns) and per read out pulse a respective complete row (or column) is read out.

If only a part of the two-dimensional image sensor is of interest, it is known to limit the reading out to the image points or rows situated in the relevant part. It can thus be achieved that the image points that are situated in the region of interest can be read out at a higher speed, because they get a turn more often in within the same duration of a single read out pulse for an image point or a row.

Furthermore, DE 105 31 627 C1 discloses a method in which regions of a two-dimensional image sensor can be reproduced in a zoomed manner. According to this method, typically 1000×1000 physical image points are mapped on a smaller quantity of, for example 500×500 image points reproduced; for a magnification a sub-region of 500×500 physical image points can be associated 1:1 with the image points reproduced. For a reduced reproduction, however, physical image points are combined in rows and/or columns in order to enable a larger number of such physical image points to be mapped on the limited number of image points reproduced. The special feature of this method is that the degree of combination of image points locally varies, so that a non-integer factor can be realized between the number of physical image points and the image points reproduced. Whereas the spatial resolution in the reproduction of the image can be varied by means of such a method, the temporal resolution remains the same.

Considering the foregoing it was an object of the present invention to provide a method and a device whereby regions of interest of an electronically acquired image can be reproduced with an adaptable temporal resolution.

The method of reading out an electronic image sensor that is subdivided into image points is based on the recognition of the fact that image points or groups of image points can be read out with a given clock period. The groups of image points may be, for example image lines. The clock period corresponds to the time required for reading out an image point or a group of image points and is generally limited in the downward direction by the capability of the electronic components. The method is characterized in that at least two quantities of image points and/or groups of image points can be distinguished, the image points and/or groups of image points of a first quantity being read out at a rate other than that at which the image points and/or groups of image points of a second quantity are read out. When there are n≧2 of such quantities, therefore, course, there are n different read out rates.

The method thus creates different regions in the image which are read out at a respective different rate. The subdivision may be such that an image region of particular interest (ROI) is read out at a rate which is higher than that used for the other image regions. This offers the user flexible adaptation of the image processing chain to the relevant requirements of the instantaneous application; at the same time optimum use can be made of the available resources of the reading electronics, the data transmission and the data processing.

The method in accordance with the invention reproduces the image regions of interest with the highest quality and with a high temporal. The quasi-immediate availability of images of the regions of interest also enhances the interactive properties of the image processing chain; this can be of great importance notably in the case of medical X-ray imaging methods. For example, for the time-critical placement of a catheter or a needle in the body of a patient it is very important that the attending physician is offered instantaneous images of the procedure.

Except for the fine temporal resolution, no information is lost from the image regions that are less frequently scanned by means of the method, because the image information contained therein is collected for reading a plurality of images at a later stage, for example as a charge. Such a prolonged integration of the exposure in said regions at the same time results in an improved local signal-to-noise ratio and hence in imaging of higher quality.

The image points of the image sensor are typically grouped in rows of a two-dimensional image surface, the rows being read out each time uniformly with a given clock period. The reading out of image sensors in rows is the present state of the art and is performed notably for FDXD detectors (FDXD stands for "Flat Dynamic X-ray Detector"). However, for future detectors it may nevertheless be possible to address only parts of rows, so that the regions of interest (ROI) that are scanned at a higher rate need not necessarily over complete rows or lines but may in principle assume any desired shape.

In conformity with a preferred version of the method, the different quantities of image points and/or groups of image points (for example, rows or lines) overlap at least in a sub-region of the image surface. For the quantities that do not have common elements, this means that: when the convex envelope is formed each time for the image points in the surface of the image sensor that are included in the quantities, these convex envelopes overlap. A sub-region in which the quantities overlap is thus reproduced partly with a high scanning frequency and partly with a low scanning frequency.

The lines of image points of an image may notably be associated alternately with two or more quantities with different scanning rates. For example, the even image lines may be scanned at double the scanning frequency in comparison with the odd image lines. The even image lines thus offer a rendition of the complete image with a higher temporal resolution and a reduced spatial resolution. The odd lines, being read only half as often, then provide an improved spatial resolution. Evidently, the ratio of the scanning rates in the two quantities of image lines can be chosen at random. Furthermore, it is not necessary to change the scanning frequency after every image line; for example, three neighboring lines can be scanned with a low scanning frequency, and then one line with a higher scanning frequency and this pattern may be periodically repeated or not.

In a further version of the method the signals from image points read out are processed in dependence on the scanning rate of the relevant image point. Notably the signal amplification can then be adjusted in conformity with the scanning rate. Consequently, the fact can be taken into account that charge is collected in the image points in customary electronic image sensors, which charge increases continuously as a function of the exposure time. Image points that are less frequently scanned, therefore, attain a correspondingly larger charge, because it is collected over a longer period of time. The sensitivity of the reading devices is adapted to this larger charge to be expected. It is to be ensured that the scanning frequency is still high enough in the image regions that are less frequently read out, so that there is no saturation of the image points which could lead to a loss of information. This holds at least for those image points which still contain information of interest. Saturation of, for example image points that are situated outside the irradiation zone of a patient, however, may be ignored.

The image sensor may notably be a sensor that is sensitive to X-rays. Image sensors of this kind are used for medical imaging methods such as, for example X-ray computed tomography where some applications require a rendition of spatially limited regions of interest with a high temporal resolution. The equipment required for medical imaging methods generally is very expensive, so that it is especially advantageous to make optimum use of the resources provided.

In conformity with a further version of the method, the image points and/or groups of image points that are read out with a lower scanning rate are irradiated with a lower intensity. The image points read out with a lower scanning rate have more time available for collecting image information, for example in the form of a charge, between two read out pulses. These image points, therefore, can be exposed to a lower intensity of the imaging radiation, without the image information yielded by the less frequent scanning of the image points being reduced. This offers the possibility of exposing image regions with a reduced intensity as is advantageous notably for medical X-ray imaging, because local radiation attenuation can then minimize the dose whereto the patient is exposed.

The invention also relates to a device for reading out an electronic image sensor that is subdivided into image points and is provided with an addressing unit for selecting the image points and/or groups of image points to be read out in one clock period, as well as with a reading unit for reading out the selected and addressed image points and/or groups of image points. The addressing unit is arranged in such a manner that it selects the addressed image points and/or groups of image points at a different rate. Unlike in customary addressing units, the relevant image points or groups of image points thus are not selected with the same frequency in an ordered sequence; instead there are at least two quantities of image points or groups of image points, the elements of one quantity being selected more often by the addressing unit than the elements of the other quantity.

The above method can be implemented by means of such a device such that the previously described advantages can be achieved. The addressing unit and the reading unit of the device can notably be constructed in such a manner that they are also capable of implementing the various versions of the method, for example for row-wise subdivision of the image, overlapping quantities of image points with a different scanning rate, a sensitivity of the image sensor to X-rays and the like.

The reading unit may notably be arranged in such a manner that it bases the processing of the signals read out from the image points on the rate at which the relevant image points and/or groups of image points were addressed. Preferably, the signal amplification is adapted to this rate so that the fact can be taken into account that image points that are scanned less frequently can be expected to have a higher signal strength because of the longer exposure time.

The invention will be described in detail hereinafter with reference to the Figures. Therein:

Figure 1:
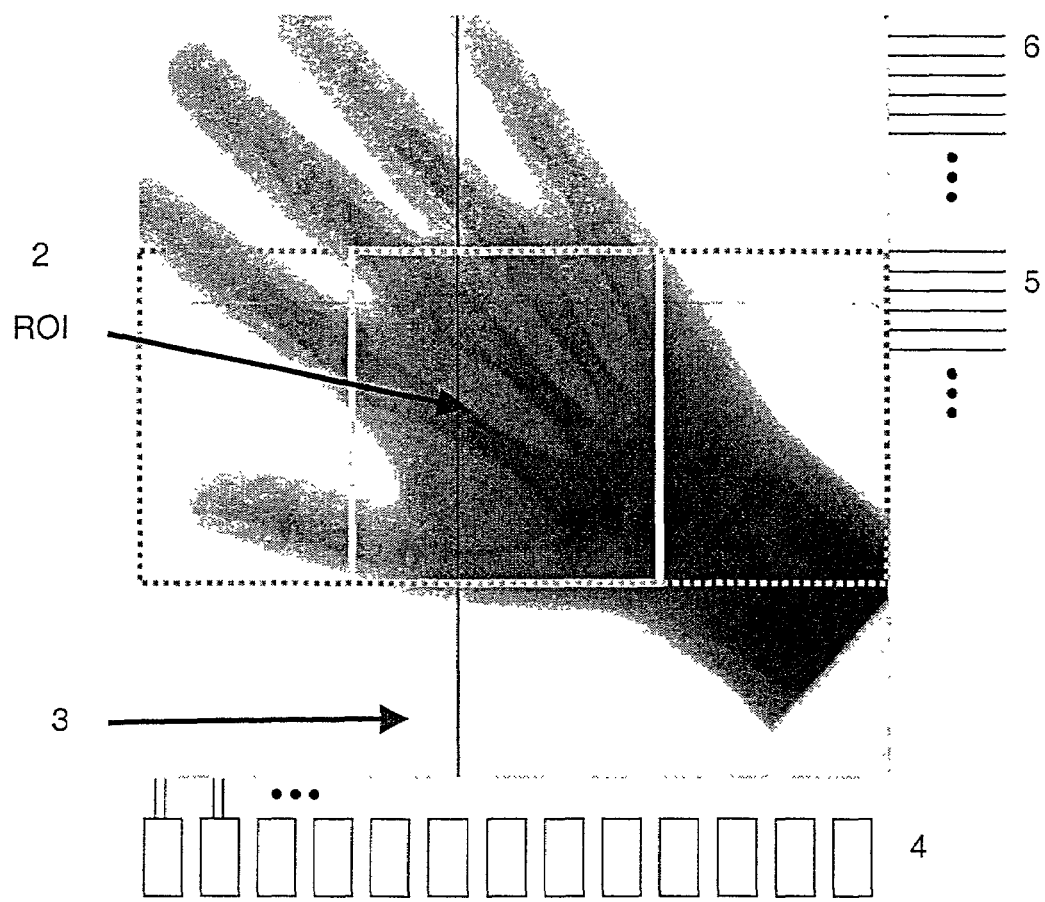
FIG. 1 shows the X-ray image of a hand, the image being subdivided into regions of great interest and regions of less interest.

FIG. 1 shows the X-ray image 1 of a hand, a region of interest 2 (ROI) being accentuated at the center of the image. The remainder 3 of the image represents a less interesting region. Furthermore, at the edge of the image the gate lines 5 of the region of interest 2 and the gate lines 6 of the remaining region 3 are indicated, and at the lower edge of the image there are shown the amplifier chips 4 which serve to read out image lines.

The image sensor is an FDXD detector which is read out by applying one line after the other directly to a field output. During the reading out of a line, no lines in the vicinity are affected. Unlike in the case of, for example image sources based on CCD, complete reading out of the image is not required each time. The image lines that are not read out and have not been addressed in a given clock period or cycle usually remain unaffected for further use. This holds subject to the condition that no relevant pixel reaches saturation during the multiple exposure to X-ray pulses. Non-relevant pixels are, for example pixels that are exposed directly to the radiation beam that has not passed through the patient. The central region of interest ROI 2 that is shown in FIG. 1 is read out at an increased scanning rate by addressing the corresponding gate lines 5. This scanning rate may amount to, for example 60 images per second. The complete image is then read out at a lower rate of, for example half or one quarter of the maximum scanning rate (meaning 30 or 15 images per second) while using all gate lines 5 and 6 in the correct order. During the reading out the sensitivity of the amplifier chips 4 is switched over in conformity with the amount of charge to be expected within and outside the region of interest ROI 2.

Figure 2:
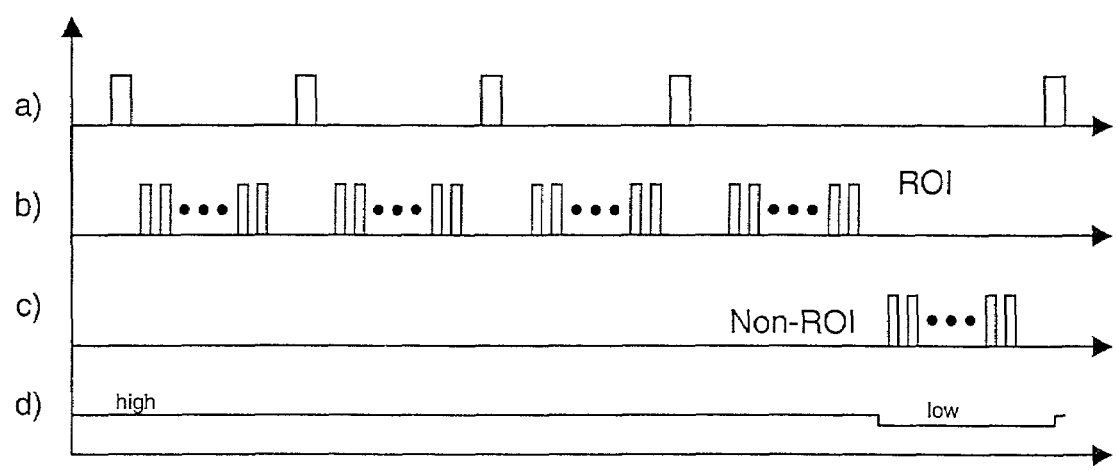
FIG. 2 shows the adaptation in time of the control of the X-ray tube as well as the reading out of the image points in a method in accordance with the invention.

FIG. 2 shows diagrammatically the execution in time of various processes during the execution of the method in accordance with the invention. The time is plotted on the horizontal axis.

The upper diagram a) of FIG. 2 shows the exposure pulses supplied by the X-ray tube. During each pulse a corresponding quantity of charge is additively collected in the image points of the image sensor, said charge being carried off when the image point is read out.

The second diagram b) of FIG. 2 shows the addressing of the gate lines 5 and hence the reading out of the region of interest 2 (ROI). After completion of reading out, a new X-ray pulse may be given. Because it is not necessary to read out the complete image between two of such X-ray pulses, their spacing can be reduced accordingly, resulting in an improved temporal resolution of the rendition of the region of interest 2.

The diagram c) shows the addressing of the gate lines 6 of the region 3 outside the ROI 2. As appears from the diagrams b) and c), the region of interest ROI is read out four times before the remaining region 3 of the image is read out once. The region of interest ROI is thus scanned at a scanning rate which is four times higher than that used for the remainder of the image. In the last interval between two X-ray pulses that is shown in FIG. 2 the complete image is read out, that is, the region of interest ROI as well as the remaining part 3 of the image. Consequently, a longer period of time is required for complete reading out, so that the interval between the two X-ray pulses must be chosen to be proportionally longer.

The lowermost diagram d) of FIG. 2 shows the sensitivity of the amplifiers during the reading out. It can be seen that the sensitivity is high during the reading out of image points of the region of interest ROI and lower during the reading out of the remaining image region 3. This change of the sensitivity takes into account the fact that the image regions 3 that are less frequently read out are exposed several times between two read-out operations (that is, four times in the example shown), so that a proportionally larger charge is to be expected. This larger charge is compensated by the reduced sensitivity.

The method in accordance with the invention thus enables the region of particular interest ROI of an image to be reproduced with a higher scanning rate and hence with a higher temporal resolution. Regions of the image that are less interesting are reproduced with a lower temporal resolution, but have a better signal-to-noise ratio because of the longer exposure of such regions.

The invention claimed is:

1. A method of reading out an electronic image sensor that is subdivided into image points and wherefrom image points or groups of image points can be read out with a predetermined clock period, and organized into at least two quantities of image points and/or groups of image points whose elements can be read out at different scanning rates, the method comprising:
   selecting a region of interest (ROI) of the sensor for which the desired temporal resolution of the image is higher than that for a region outside the ROI of the sensor;
   collecting image information from the region outside the ROI for reading at a later stage; and
   separately reading each of the image points to provide an image,
   wherein the quantities of image points and/or groups of image points in the selected region are read out at a higher scanning rate than the scanning rate for quantities of image points and/or groups of image points in the region outside the ROI, and
   wherein a prolonged integration of an exposure in the region outside the ROI results in an improved local signal-to-noise ratio and a higher image quality in the region outside the ROI.

2. A method as claimed in claim 1, characterized in that the image points are grouped so as to form lines of a two-dimensional image and that the lines that belong to a quantity are all read out at a uniform scanning rate.

3. A method as claimed in claim 2, characterized in that lines of image points of the image are alternately assigned to at least two quantities with different scanning rates.

4. A method as claimed in claim 1, characterized in that the quantities of image points and/or groups of image points overlap at least in a region of the image surface.

5. A method as claimed in claim 1, characterized in that amplification of the signals from image points read out is performed in dependence on the relevant scanning rate of the image points.

6. A method as claimed in claim 1, characterized in that the image sensor is sensitive to X-rays.

7. A method as claimed in claim 1, characterized in that the intensity of irradiation of image points that are read out at a lower scanning rate is less than the intensity of irradiation of image points that are read out at a higher scanning rate.

8. A device for reading out an electronic image sensor that is subdivided into image points and is provided with an addressing unit for selecting the image points and/or groups of image points to be read out within one clock period as well as with a reading unit for reading out the selected and addressed image points and/or groups of image points, characterized in that the addressing unit is arranged in such a manner that it selects the addressable image points and/or groups of image points at different scanning rates, the device collects image information from image points in a region outside a region of interest (ROI) of the sensor for reading at a later stage, and the device reads out quantities of image points and/or groups of image points in the region of interest of the sensor having a higher desired temporal resolution at a higher rate than the rate at which the device reads out quantities of image points and/or groups of image points in the region outside the ROI of the sensor, wherein a prolonged integration of an exposure in the image points in the region outside the ROI results in an improved local signal-to-noise ratio and a higher image quality in the region outside the ROI.

9. A device as claimed in claim 8, characterized in that the reading unit is arranged in such a manner that it bases the signal amplification on the scanning rate at which the relevant image points and/or groups of image points are addressed.

10. A device as claimed in claim 8, characterized in that the image points are grouped so as to form lines of a two-dimensional image and that the lines that belong to a quantity are all read out at a uniform scanning rate.

11. A device as claimed in claim 10, characterized in that lines of image points of the image are alternately assigned to at least two quantities with different scanning rates.

12. A device as claimed in claim 8, characterized in that the quantities of image points and/or groups of image points that are read out at different rates overlap at least in a region of the image surface.

13. A device for processing signals from an electronic image sensor that is subdivided into image points, comprising an addressing unit for selecting image points to be read out and a reading unit for reading out the selected image points, the device being adapted to select and read out a set of the image points to form an image having uniform spatial resolution, the set of image points including a first group of image points in a region of interest that is read out at a first rate and a second group of image points outside said region of interest that is read out at a second rate, the second rate being less than the first rate, the device being adapted to collect image information from image points outside the region of interest for reading at a later stage, wherein a prolonged integration of the exposure in the image points outside the region of interest results in an improved local signal-to-noise ratio and a higher image quality.

14. A device as claimed in claim 13, wherein the image points are grouped so as to form lines of a two-dimensional image, the first group of image points including a first set of lines and a second group of image points including a second set of lines.

15. A device as claimed in claim 13, wherein the set of image points includes image points that at certain times are included in the first group of image points and at other times are included in the second group of image points.

16. A device as claimed in claim 13, wherein the area of the image sensor containing the first group of image points overlaps the image area containing the second group of image points.

17. A device as claimed in claim 13, wherein the processing of signals from the image sensor includes amplification, and the amount of amplification from the first group of image points differs from the amount of amplification from the second group of image points.

18. A device as claimed in claim 13, wherein the image sensor is sensitive to X-rays.

* * * * *